United States Patent [19]

Charbonneau et al.

[11] 4,341,688

[45] Jul. 27, 1982

[54] POLY(ESTER-AMIDE) CAPABLE OF FORMING AN ANISOTROPIC MELT PHASE DERIVED FROM DIHYDROXYANTHRAQUINONE, HYDROXYBENZOIC ACID, DICARBOXYLIC ACID, AND AROMATIC MONOMER CAPABLE OF FORMING AN AMIDE LINKAGE

[75] Inventors: Larry F. Charbonneau, Chatham; Gordon W. Calundann, N. Plainfield; Anthony J. East, Madison, all of N.J.

[73] Assignee: Celanese Corporation, New York, N.Y.

[21] Appl. No.: 251,818

[22] Filed: Apr. 7, 1981

[51] Int. Cl.³ .............................................. C08G 69/44
[52] U.S. Cl. ...................................... 524/592; 528/125; 528/128; 528/172; 528/183; 528/184; 528/185; 528/210; 528/211; 528/220; 528/226; 528/229; 528/339; 528/344
[58] Field of Search ........ 528/125, 128, 172, 183–185, 528/211, 210, 220, 226, 229, 339, 344; 260/37 N

[56] References Cited

U.S. PATENT DOCUMENTS 3,859,251  1/1975  Kuhfuss et al. .................. 528/183
4,182,842  1/1980  Jackson et al. .................. 528/184
4,272,625  6/1981  McIntyre et al. ................. 528/183

Primary Examiner—Lester L. Lee
Attorney, Agent, or Firm—Charles B. Barris

[57] ABSTRACT

A melt processable poly(ester-amide) which is capable of forming an anisotropic melt phase is provided. The poly(ester-amide) of the present invention consists essentially of the recurring units (a) dioxyanthraquinone moiety, (b) p-oxybenzoyl moiety, (c) dicarboxyl moiety, as defined, and (d) aromatic moiety capable of forming an amide linkage in the polymer, in the proportions indicated. Preferably, the moiety capable of forming an amide linkage is derived from p-aminophenol or p-phenylenediamine. The resulting poly(ester-amide) exhibits a melting temperature below approximately 400° C., preferably below approximately 350° C. The poly(ester-amide) of the present invention is preferably formed by a melt polymerization technique.

33 Claims, No Drawings

POLY(ESTER-AMIDE) CAPABLE OF FORMING AN ANISOTROPIC MELT PHASE DERIVED FROM DIHYDROXYANTHRAQUINONE, HYDROXYBENZOIC ACID, DICARBOXYLIC ACID, AND AROMATIC MONOMER CAPABLE OF FORMING AN AMIDE LINKAGE

BACKGROUND OF THE INVENTION

The use of objects molded from synthetic polymers has expanded rapidly in the last several decades. In particular, polyesters and polyamides have widely gained acceptance for general molding applications and in the formation of fibers and films. An additional class of polymers known as poly(ester-amides) have been disclosed. Such disclosures include U.S. Pat. Nos. 2,547,113; 2,946,769; 3,272,774; 3,272,776; 3,440,218; 3,475,385; 3,538,058; 3,546,178; 3,575,928; 3,676,291; 3,865,792; 2,926,923; and 4,116,943. Polyimide esters are disclosed in German Offenlegungsschrift No. 2,950,939 and in U.S. Pat. No. 4,176,223.

Although many polyesters, polyamides, and poly(ester-amides) have mechanical properties suitable for general applications, most polyesters, polyamides, and poly(ester-amides) are not suitable for high strength service because the mechanical properties are not sufficiently high. One group of polymers that is suitable for high strength service without the use of a reinforcing agent is a new class of polymers exhibiting a general overall balance of mechanical properties substantially enhanced over previous polymers. These polymers and/or their melts have been described by various terms, including "liquid crystalline," "liquid crystal," "thermotropic," "mesogenic," and "anisotropic." Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat, and fairly rigid along the long axis of the molecule and commonly have chain extending linkages that are either coaxial or parallel.

Disclosures of polyesters which exhibit melt anisotropy include (a) Polyester X7G-A Self Reinforced Thermoplastic, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Nos. 2520819, 2520820, 2722120, 2834535, 2834536, and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,462; 4,224,433; 4,228,218; 4,230,817; 4,232,143; 4,232,144; 4,238,598; 4,238,599; 4,245,082; and 4,245,084; and (g) U.K. Application Nos. 2,002,404; 2,008,598A; and 2,030,158A. See also commonly assigned U.S. Ser. Nos. 54,049, now U.S. Pat. No. 4,256,624, filed July 2, 1979; 91,003, filed Nov. 5, 1979; 109,593, now U.S. Pat. No. 4,265,802, filed Jan. 4, 1980; 109,575, now U.S. Pat. No. 4,285,852, filed Jan. 4, 1980; 128,759, filed Mar. 10, 1980; 128,778, now U.S. Pat. No. 4,279,803, filed Mar. 10, 1980; and 169,014, filed July 15, 1980.

Representative disclosures of liquid crystalline polyamide dopes include U.S. Pat. Nos. 3,673,143; 3,748,299; 3,767,756; 3,801,528; 3,804,791; 3,817,941; 3,819,587; 3,827,998; 3,836,498; 4,016,236; 4,018,735; 4,148,774; and Re. 30,352.

U.S. Pat. No. 4,182,842 discloses poly(ester-amides) prepared from an aromatic dicarboxylic acid, ethylene glycol, and a p-acylaminobenzoic acid. This patent neither discloses nor suggests the poly(ester-amide) of the present invention. A similar disclosure is Japan 54 125271.

European Patent Application No. 79301276.6 (Publication No. 0 007 715) discloses melt processable fiber-forming poly(ester-amides) comprising residues of one or more aminophenols selected from p-aminophenol and p-N-methylaminophenol and residues of one or more dicarboxylic acids. The poly(ester-amide) contains a balance of linear difunctional residues and dissymmetric difunctional residues derived from either the aminophenols or the acids. The linear difunctional residues and dissymmetric difunctional residues are chosen so as to give a product which melts below its decomposition temperature and exhibits optical anisotropy in the melt. This patent neither discloses nor suggests the poly(ester-amide) of the present invention which contains a dioxyanthraquinone moiety.

U.S. Pat. No. 3,859,251 discloses a poly(ester-amide) which includes a dicarboxyl moiety which comprises 50 to 100 mole percent of units derived from an acyclic aliphatic dicarboxylic acid. Such units are not required in the poly(ester-amide) of the present invention. Moreover, while the patent discloses the inclusion of a p-oxybenzoyl moiety, there is no disclosure or suggestion of the usefulness of a poly(ester-amide) containing a dioxyanthraquinone moiety, such as that of the present invention.

U.S. Pat. No. 3,809,679 discloses poly(ester-amides) consisting of 10 to 90 mole percent of recurring structural units derived from a dicarboxylic acid dihalide and a dihydroxy compound of a specified formula and 10 to 90 mole percent of recurring structural units derived from a dicarboxylic acid dihalide and a diamino compound of a specified formula. The poly(ester-amides) specifically exclude moieties derived from aromatic hydroxyacids, such as the p-oxybenzoyl moiety included in the poly(ester-amide) of the present invention. Furthermore, most, if not all, of the poly(ester-amides) there disclosed are not readily melt processable, and there is no disclosure of the existence of an anisotropic melt phase.

Commonly assigned U.S. application Ser. Nos. 214,557, filed Dec. 9, 1980, entitled "Poly(ester-amide) Capable of Forming an Anisotropic Melt Phase Derived From 6-Hydroxy-2-Naphthoic Acid, Dicarboxylic Acid, and Aromatic Monomer Capable of Forming an Amide Linkage" (Inventors: Anthony J. East, Larry F. Charbonneau, and Gordon W. Calundann); Ser. No. 251,629, filed Apr. 6, 1981, entitled "Poly(ester-amide) Capable of Forming an Anisotropic Melt Phase Derived From 6-Hydroxy-2-Naphthoic Acid, Other Aromatic Hydroxyacid, Carbocyclic Dicarboxylic Acid, and Aromatic Monomer Capable of Forming an Amide Linkage" (Inventors: Larry F. Charbonneau, Anthony J. East, and Gordon W. Calundann); and Ser. No. 251,625, filed Apr. 6, 1981, entitled "Poly(ester-amide) Capable of Forming An Anisotropic Melt Phase Derived From 6-Hydroxy-2-Naphthoic Acid, Aromatic Monomer Capable of Forming an Amide Linkage, and Other Aromatic Hydroxyacid" (Inventors: Gordon W. Calundann, Larry F. Charbonneau, and Anthony J. East), disclose melt processable poly(ester-amides) exhibiting anisotropy in the melt phase which include an oxynaphthoyl moiety. The poly(ester-amide) of the present invention does not require the presence of oxynaphthoyl moiety and has been found to exhibit an optically anisotropic melt phase in combination with excellent tractability.

Therefore, it is an object of the present invention to provide an improved poly(ester-amide) which is suited for the formation of quality molded articles, melt extruded fibers, and melt extruded films.

It is also an object of the present invention to provide an improved poly(ester-amide) which forms a highly tractable melt phase.

It is also an object of the present invention to provide an improved poly(ester-amide) which forms an anisotropic melt phase at a temperature well below its decomposition temperature and which may form quality fibers, films, and molded articles.

It is also an object of the present invention to provide an improved melt processable poly(ester-amide) capable of forming an anisotropic melt phase at a temperature below approximately 400° C., and preferably below approximately 350° C.

It is also an object of the present invention to provide an improved melt processable poly(ester-amide) which exhibits improved adhesion, improved fatigue resistance, and increased transverse strength.

These and other objects, as well as the scope, nature and utilization of the present invention, will be apparent to those skilled in the art from the following detailed description.

SUMMARY OF THE INVENTION

A melt processable poly(ester-amide) capable of forming an anisotropic melt phase at a temperature below approximately 400° C. is provided. The poly(ester-amide) consists essentially of the recurring moieties I, II, III, and IV wherein:

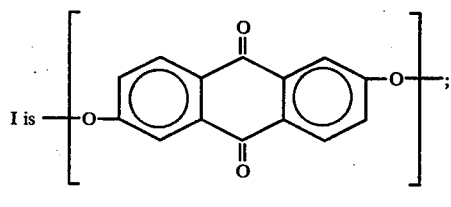

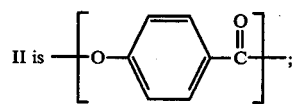

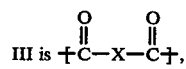

where X is selected from at least one member of the group consisting of (a) 1,3-phenylene radicals which optionally are replaced with up to 75 mole percent of 1,4-phenylene radicals based upon the total concentration of 1,3-phenylene and 1,4-phenylene radicals present in moiety III,

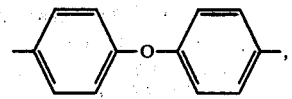

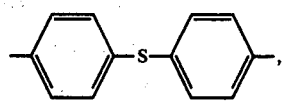

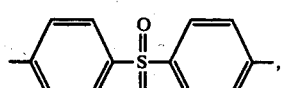

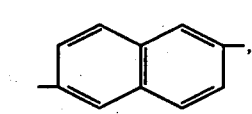

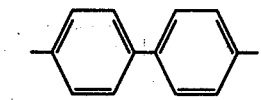

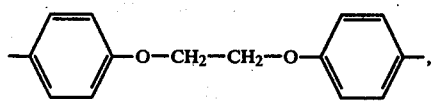

(h) a divalent aliphatic carbocyclic radical, and
(i) mixtures of the foregoing; and IV is $-(Y-Ar-Z-)$ where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 5 to 35 mole percent, moiety II is present in a concentration within the range of approximately 20 to 80 mole percent, moiety III is present in a concentration within the range of approximately 10 to 40 mole percent, and moiety IV is present in a concentration within the range of approximately 5 to 35 mole percent, with the total molar concentration of moieties I and IV being substantially equal to the molar concentration of moiety III.

DESCRIPTION OF THE PREFERRED EMBODIMENTS

The poly(ester-amide) of the present invention includes four recurring moieties which when combined in the poly(ester-amide) have been found to form an atypical, optically anisotropic melt phase. The polymer forms an anisotropic melt phase at a temperature below approximately 400° C. (e.g., below approximately 350° C.). The polymer melting temperatures may be confirmed by the use of a differential scanning calorimeter (i.e., DSC) employing repeat scans at a 20° C. per minute heat-up rate and by observing the peak of the DSC melt transition. The poly(ester-amide) commonly exhibits a melting temperature of at least approximately 200° C. and preferably of at least approximately 250° C. as determined by differential scanning calorimetry. The poly(ester-amide) of the present invention may exhibit more than one DSC transition temperature.

Because of its ability to exhibit anisotropic properties (i.e., liquid crystalline properties) in the melt, the poly(ester-amide) readily can form a product having a highly oriented molecular structure upon melt processing. Preferred poly(ester-amide) compositions are capable of undergoing melt processing at a temperature within the range of approximately 250° C. to 350° C., as discussed more fully hereinafter.

The poly(ester-amide) includes four essential moieties. Moiety I can be termed a 2,6-dioxyanthraquinone moiety and possesses the structural formula:

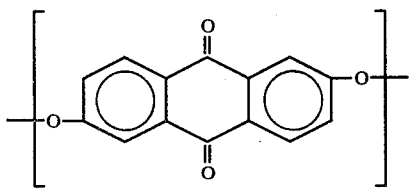

While not specifically illustrated in the structural formula, at least some of the hydrogen atoms present upon the aromatic rings of moiety I may be substituted. Representative ring substituted compounds from which moiety I can be derived include those containing one or more chloro, methyl, methoxy, and/or phenyl substituents. The presence of ring substitution tends to modify to some degree the physical properties of the resulting polymer (e.g., the polymer may soften at a lower temperaturwe, its impact strength may be improved, and the crystallinity of the solid polymer may be decreased). In a preferred embodiment wherein a poly(ester-amide) of optimum crystallinity in the solid state is desired, no ring substitution is present.

Unsubstituted 2,6-dihydroxyanthraquinone is available commercially under the common name anthraflavic acid from Imperial Chemical Industries and others. The inclusion of the 2,6-dioxyanthraquinone moiety in combination with the other recited moieties has been found to yield the desired tractability and optically anisotropic melt phase.

Moiety I is present in the poly(ester-amide) of the present invention in a concentration within the range of approximately 5 to 35 mole percent, preferably within the range of approximately 5 to 30 mole percent. In preferred embodiments, moiety I is present in a concentration within the range of approximately 15 to 20 mole percent.

The second key recurring unit (moiety II) of the poly(ester-amide) is a 4-oxybenzoyl moiety of the structural formula:

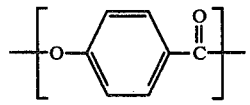

Although moiety II may be substituted in the same manner as moiety I, highly satisfactory polymers can be formed wherein moiety II is free of ring substitution.

Examples of ring substituted compounds from which moiety II may be derived include those containing a chloro, methyl, methoxy, or phenyl substituent in the 3-position and disubstituted compounds, such as 3,5-dichloro-4-hydroxybenzoic acid, 3,5-dimethyl-4-hydroxybenzoic acid, 3,5-dimethoxybenzoic acid, etc.

Moiety II comprises approximately 20 to 80 mole percent of the poly(ester-amide) of the present invention. Preferably, moiety II is present in a concentration within the range of approximately 30 to 70 mole percent (e.g., approximately 30 to 60 mole percent).

The third essential moiety (i.e., moiety III) is a carbocyclic dicarboxy moiety of the formula $$\begin{matrix} O & & O \\ \| & & \| \\ +C-X-C+ \end{matrix}.$$

Preferably, the divalent radical X is selected from at least one member of the group consisting of

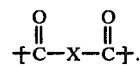 (a)

either alone or in admixture with

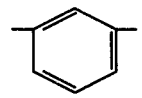 (b)

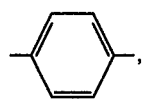 (c)

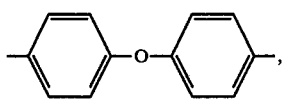 (d)

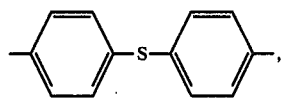 (e)

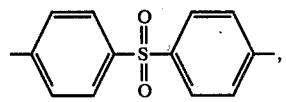 (f)

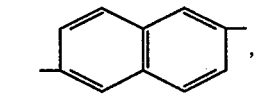 (g)

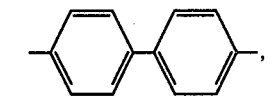

(h) a divalent aliphatic carbocyclic radical, and
(i) mixtures of the foregoing.

Preferably, the divalent aliphatic carbocyclic radical of (h) above is a divalent trans-1,4-cyclohexylene radical.

In the case where X is a divalent cyclohexylene radical, it has been found that only moiety III units in the trans configuration give rise to a poly(ester-amide) which exhibits anisotropy in the melt phase. This is believed to be due to the disruption and destruction of the rod-like nature of the polymer molecules by the presence of moiety III units in the cis configuration. However, a relatively small amount of moiety III in the cis configuration, as compared with the total amount of polymer, can be tolerated without seriously affecting the anisotropic nature of the polymer in the melt. It is nevertheless preferable to maximize the amount of moiety III in the trans configuration which is present in the polymer. Thus, it is preferred that at least 90 percent (e.g., 95 percent or more) of the cyclohexylene radicals be present in the trans configuration.

Trans- and cis-1,4-cyclohexanedicarboxylic acid can be distinguished from one another by such techniques as NMR and IR spectroscopy, as well as by their melting points. A melting point calibration curve is one means by which the relative amounts of trans- and cis-1,4-cyclohexanedicarboxylic acid in a mixture of the isomers can be determined.

It has been found that especially satisfactory results are obtained when moiety III is derived from a mixture of isophthalic acid (IA) and terephthalic acid (TA) as in (a) above. In a preferred embodiment, the mixture contains approximately 0 to 75 mole percent TA and approximately 25 to 100 mole percent IA.

It was found that a mixture of TA and IA was necessary to obtain maximum tractability and anisotropicity. If TA were used by itself as moiety III, a poly(ester-amide) with an undesirably high melting temperature would result. When IA alone is used, there is a decrease in anisotropicity. Although not a preferred embodiment, it is believed that the use of IA alone as moiety III would yield a polymer having sufficiently desirable properties.

Again, although moiety III may be substituted in the same manner as moiety I, highly satisfactory polymers can be formed wherein the rings are free of substitution.

Moiety III is present in the poly(ester-amide) of the present invention in a concentration within the range of approximately 10 to 40 percent. Preferably, moiety III is present in a concentration within the range of 15 to 35 mole percent and, more preferably, in a concentration within the range of approximately 20 to 35 mole percent.

Moiety IV represents an aromatic monomer which is capable of forming an amide linkage in the polymer. Moiety IV possesses the structural formula $-Y-Ar-Z-$ where Ar is a divalent radical comprising at least one aromatic ring, Y is O, NH, or NR, and Z is NH or NR, where R is an alkyl group of 1 to 6 carbon atoms or an aryl group. R is preferably a straight-chain alkyl group of 1 to 6 carbon atoms and is more preferably a methyl group.

Preferred embodiments are those wherein Ar comprises a symmetrical divalent aromatic moiety. By "symmetrical", it is meant that the divalent bonds which join the moiety to other moieties in the main polymer chain are symmetrically disposed on one or more rings (e.g., are para to each other or diagonally disposed when present on a naphthalene ring). In an especially preferred embodiment, Ar comprises a p-phenylene radical.

Examples of monomers from which moiety IV is derived include p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl ethane, 4-amino-4'-hydroxydiphenyl sulfone, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylene dianiline), 4,4'-diaminodiphenylether (oxydianiline).

Moiety IV is present in the novel poly(ester-amide) of the present invention in a concentration of approximately 5 to 35 mole percent. Preferably, moiety IV is present in a concentration within the range of approximately 5 to 15 mole percent.

Although moiety IV can be substituted, it is preferably free of ring substitution.

In the novel poly(ester-amide) of the present invention, the total molar concentration of moieties I and IV is substantially equal to the molar concentration of moiety III; that is, the total molar quantity of amide-forming units and dioxy units and the total molar quantity of dicarboxy units present within the poly(ester-amide) will be substantially equal.

The poly(ester-amide) of the present invention may consist essentially of, for example, approximately 5 to 35 mole percent of moiety I, approximately 20 to 80 mole percent of moiety II, approximately 10 to 40 mole percent of moiety III, and approximately 5 to 35 mole percent of moiety IV. Preferred compositions consist essentially of approximately 5 to 30 mole percent of moiety I, approximately 30 to 70 mole percent of moiety II, approximately 15 to 35 mole percent of moiety III, and approximately 5 to 15 mole percent of moiety IV. Even more preferred are those compositions which consist essentially of approximately 15 to 20 mole percent of moiety I, approximately 30 to 60 mole percent of moiety II, approximately 20 to 35 mole percent of moiety III, and approximately 5 to 15 mole percent of moiety IV.

The various moieties upon polymer formation will tend to be present in a random configuration.

The substituents, if present, on the rings of each of the moieties described above are selected from the group consisting of an alkyl group of 1 to 4 carbon atoms, an alkoxy group of 1 to 4 carbon atoms, halogen, phenyl, and mixtures of the foregoing.

Other ester-forming moieties (e.g., dicarboxy, dioxy, or hydroxycarboxy units) other than those previously discussed additionally may be included in the poly(ester-amide) of the present invention in a minor concentration as long as such moieties do not adversely influence the desired anisotropic melt phase exhibited by the poly(ester-amide) heretofore defined and do not raise the melting temperature of the resulting polymer above approximately 400° C.

The poly(ester-amide) of the present invention commonly exhibits

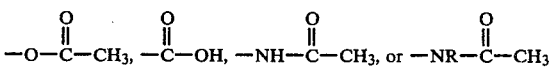

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

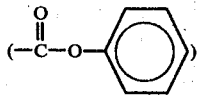

and methylester

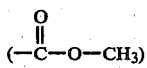

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting temperature for a limited period of time (e.g., for a few minutes).

The poly(ester-amide) of the present invention tends to be substantially insoluble in all common solvents, such as hexafluoroisopropanol and o-chlorophenol, and accordingly is not susceptible to solution processing. It can surprisingly be readily processed by common melt processing techniques as discussed hereafter. Most compositions are soluble to some degree in pentafluorophenol.

The poly(ester-amide) of the present invention commonly exhibits a weight average molecular weight of about 2,000 to about 50,000, and preferably about 10,000 to 30,000, e.g., about 15,000 to 22,000. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The poly(ester-amide) of the present invention is capable of undergoing melt processing at a temperature within the range of approximately 200° C. to 400° C. Preferably, the polymer is melt processed at a temperature within the range of approximately 250° C. to 350° C. and more preferably within the range of approximately 270° C. to 330° C.

The melting temperature (Tm) of the poly(ester-amide) of the present invention may vary widely with the composition of the poly(ester-amide).

The poly(ester-amide) prior to heat treatment additionally commonly exhibits an inherent viscosity (i.e., I.V.) of at least approximately 0.7 dl./g., and preferably at least approximately 2.0 dl./g., (e.g., approximately 2.5 to 3.0 dl./g.) when measured at a concentration of 0.1 weight/volume percent in pentafluorophenol at 60° C.

The poly(ester-amide) of the present invention is readily tractable and forms an anisotropic melt phase whereby an atypical degree of order is manifest in the molten polymer. The improved tractability is due, at least in part, to the presence of moiety I, i.e., the 2,6-dioxyanthraquinone, in combination with the other recited moieties. It has been observed that the tractability of the polymer is a function of the molar concentration of moiety I in the polymer to at least some degree.

The subject poly(ester-amide) readily forms liquid crystals in the melt phase. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. Light is transmitted when the sample is optically anisotropic even in the static state.

The poly(ester-amide) of the present invention may be formed by a variety of techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, amine groups, acetamide groups, etc. The organic monomer compounds may be reacted in the absence of a heat-exchange fluid via a melt acidolysis procedure. They accordingly may be heated initially to form a melt solution of the reactants with the reaction continuing as solid polymer particles are formed and suspended therein. A vacuum may be applied to facilitate removal of volatiles formed during the final stage of the condensation (e.g., acetic acid or water). Such a technique is disclosed in European Patent Application No. 79301276.6 (Publication No. 0 007 715), which is herein incorporated by reference.

In commonly assigned U.S. Pat. No. 4,067,852 of Gordon W. Calundann, entitled "Melt Processable Thermotropic Wholly Aromatic Polyester Containing Polyoxybenzoyl Units" is described a slurry polymerization process which, although directed to the production of wholly aromatic polyesters, may be employed to form the poly(ester-amide) of the present invention. In that process, the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the dioxyaryl moiety (i.e., moiety I), the hydroxyacid moiety (i.e., moiety II), and the amide-forming moiety (i.e., moiety IV) are derived may be initially provided in a modified form whereby the usual hydroxyl groups of these monomers are esterified (i.e., they are provided as acyl esters). For instance, lower acyl esters of 2,6-dihydroxyanthraquinone, p-hydroxybenzoic acid, and p-aminophenol, wherein the hydroxy groups are esterified, may be provided as reactants. The lower acyl groups preferably have from about 2 to about 4 carbon atoms. Preferably, the acetate esters of the organic compounds which form moieties I, II, and IV are provided. In addition, the amine group(s) of moiety IV may be provided as lower acyl amides. Accordingly, particularly preferred reactants for the condensation reaction are 2,6-dihydroxyanthraquinone diacetate, p-acetoxybenzoic acid, and p-acetoxyacetanilide.

Representative catalysts which optionally may be employed in either the melt acidolysis procedure or in the procedure of U.S. Pat. No. 4,067,852 include alkyl tin oxide (e.g., dibutyl tin oxide), diaryl tin oxide, alkyl tin acids, acyl esters of tin, titanium dioxide, alkoxy titanium silicates, titanium alkoxides, alkali and alkaline earth metal salts of carboxylic acids (e.g., sodium acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.12 percent by weight.

The molecular weight of a previously formed polyester may be further increased via a solid state polymerization procedure wherein the particulate polymer is heated in a flowing inert gaseous atmosphere (e.g., in a flowing nitrogen atmosphere) at a temperature approximately 20° C. below the melting temperature of the polymer for 10 to 12 hours.

The poly(ester-amide) of the present invention readily can be melt processed to form a variety of shaped articles, e.g., molded three-dimensional articles, fibers, films, tapes, etc. The poly(ester-amide) of the present invention is suited for molding applications and may be molded via standard injection molding techniques commonly utilized when forming molded articles. It is not essential that more severe molding conditions (e.g., higher temperatures, compression molding, impact molding, or plasma spraying techniques) be utilized. Fibers or films may be melt extruded.

A molding compound may be formed from the poly(ester-amide) of the present invention which incorporates approximately 1 to 60 percent by weight of a solid filler (e.g., talc) and/or reinforcing agent (e.g., glass fibers).

The poly(ester-amide) also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret, such as those commonly used in the melt spinning of polyethylene terephthalate, containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable poly(ester-amide) is supplied to the extrusion orifice at a temperature above its melting point, e.g., a temperature of about 270° C. to 330° C. in preferred embodiments.

Subsequent to extrusion through the shaped orifice, the resulting filamentary material or film is passed in the direction of its length through a solidification or quench zone wherein the molten filamentary material or film is transformed into a solid filamentary material or film. The resulting fibers commonly have a denier per filament of about 2 to 40, and preferably a denier per filament of about 3 to 5.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting temperature until the desired property enhancement is achieved. Thermal treatment times commonly range from a few minutes to several days. Generally, as the product is thermally treated, its melting temperature progressively is raised. The temperature of the atmosphere may be staged or continuously increased during the thermal treatment or held at a constant level. For instance, the product may be heated at 250° C., for one hour, at 260° C. for one hour, and at 270° C. for one hour. Alternatively, the product may be heated at about 10° C. to 20° C. below the temperature at which it melts for about 45 hours. Optimal heat treatment conditions will vary with the specific composition of the poly(ester-amide) and with the process history of the product.

The as-spun fibers formed from the poly(ester-amide) of the present invention are fully oriented and exhibit highly satisfactory physical properties which render them suitable for use in high performance applications. The as-spun fibers commonly exhibit an average single filament tenacity of at least 1 gram per denier (e.g., about 3 to 10 grams per denier) and an average single filament tensile modulus of at least about 200 grams per denier (e.g., about 300 to 800 grams per denier) and exhibit an extraordinary dimensional stability at elevated temperature (e.g., at temperatures of about 150 to 200° C.). Following thermal treatment (i.e., annealing), the fibers commonly exhibit an average single filament tenacity of at least 5 grams per denier (e.g., 15 to 40 grams per denier). Such properties enable the fibers to be used with particular advantage as tire cords and in other industrial applications, such as conveyor belts, hose, rope, cabling, resin reinforcement, etc. Films formed of the polyester of the present invention may be used as strapping tape, cable wrap, magnetic tape, electric motor dielectric film, etc. The fibers and films exhibit an inherent resistance to burning.

It is anticipated that the poly(ester-amide) compositions of the present invention will exhibit improved adhesion, improved fatigue resistance, and increased transverse strength over known polymers, such as wholly aromatic polyesters.

The following Examples are presented as specific illustrations of the claimed invention. It should be understood, however, that the invention is not limited to the specific details set forth in the Examples.

EXAMPLE 1

This Example illustrates the preparation of a poly(ester-amide) from 2,6-dihydroxyanthraquinone, p-hydroxybenzoic acid, isophthalic acid, terephthalic acid, and p-phenylenediamine (or derivatives thereof) in the molar ratio 15:60:15:5:5.

A 300 ml. 3-necked polymer flask was fitted with a sealed glass paddle stirrer, a gas inlet, a distillation head and condenser, and a distillate receiver. Into the flask were placed 24.32 g. (0.075 mole) of 2,6-dihydroxyanthraquinone diacetate, 54.05 g. (0.3 mole) of 4-acetoxybenzoic acid, 12.46 g. (0.075 mole) of isophthalic acid, 4.12 g. (0.025 mole) of terephthalic acid, and 4.81 g. (0.025 mole) of N,N'-1,4-phenylenebisacetamide.

The polymerization vessel was evacuated and flushed with nitrogen and was then heated in an external sand bath to 250° C. under a slow stream of nitrogen gas. The contents of the flask melted, and polymerization began. The temperature was slowly raised from 250° C. to 320° C. over a 5 hour period. Vacuum (0.35 Torr) was applied for 45 minutes while the polymer melt was held at 320° C. The polymer was extremely viscous at the end of the vacuum period.

After the polymerization vessel had cooled to room temperature, the polymer was recovered and ground in a Wiley mill. The ground polymer was extracted in a Soxhlet extractor with acetone and petroleum ether.

The polymer exhibited an inherent viscosity of 1.5 dl./g. when measured at a concentration of 0.1 weight-/volume percent in pentafluorophenol at 60° C. The polymer exhibited a glass transition temperature ($T_g$) at 130° C. and a small endothermic transition at 315° C. when measured by differential scanning calorimetry. The polymer exhibited an anisotropic melt phase.

The polymer was melt spun through a 0.007 inch single hole jet at 330° C. at a throughput of 0.14 g./min. The take-up speed was 106 m./min. The single filament properties of the as-spun fiber were:
Tenacity—1.8 g./d.
Elongation—0.7%
Initial Modulus—253 g./d.
Denier—15

EXAMPLE 2

This Example illustrates the preparation of a poly(ester-amide) from 2,6-dihydroxyanthraquinone, p-hydroxybenzoic acid, isophthalic acid, terephthalic acid, and p-aminophenol (or derivatives thereof) in the ratio 20:50:15:10:5.

Into the flask described in Example 1 were placed 32.42 g. (0.1 mole) of 2,6-dihydroxyanthraquinone diacetate, 45.04 g. (0.25 mole) of 4-acetoxybenzoic acid, 12.46 g. (0.075 mole) of isophthalic acid, 8.31 g. (0.05 mole) of terephthalic acid, and 4.83 g. (0.025 mole) of N-[4-(acetyloxy)phenyl]acetamide.

The flask was evacuated and flushed with nitrogen and was then heated using an external oil bath to 250° C. in order to initiate polymerization. Polymerization was conducted under nitrogen by steadily increasing the temperature of the oil bath to 330° C. over a 3 hour time period. The pressure in the reaction vessel was then lowered to 0.4 Torr, and polymerization was continued for an additional 45 minutes at 330° C.

After cooling to room temperature, the polymer was ground in a Wiley mill and was extracted as in Example 1.

The polymer exhibited an inherent viscosity of 1.54 dl./g. when measured at a concentration of 0.1 weight-/volume percent in pentafluorophenol at 60° C. The polymer exhibited a $T_g$ of 130° C. and a $T_m$ of 312° C. when measured by differential scanning calorimetry. The polymer exhibited an anisotropic melt phase.

Further solid phase polymerization was conducted under a stream of nitrogen (200 ml./min.) according to the following time-temperature schedule: room temperature to 150° C., 1 hour; 150° C. to 170° C., 2 hours; 170° C., 16 hours; 175° C., 1 and ½ hours; 180° C., 2 hours; and 185° C., 2 and ½ hours.

Following solid phase polymerization, the polymer exhibited an I.V. of 2.14 dl./g., when measured as previously described. When measured by differential scanning calorimetry, the polymer exhibited a $T_g$ of 132° C. and a $T_m$ of 327° C.

Fibers spun from the polymer at 345° C. at a throughput of 0.14 g./min. and at a wind-up speed of 321 m./min. exhibited the following single filament as-spun properties:
Tenacity—7.1 g./d.
Elongation—1.37%
Initial Modulus—628 g./d.
Denier—4.1

The fibers were heat treated in a flowing nitrogen atmosphere at 250° C. for 15 hours. The heat treated fiber properties were:
Tenacity—14.3 g./d.
Elongation—2.2%
Initial Modulus—692 g./d.

Fibers spun from the same polymer at 330° C. at a throughput of 0.14 g./min. and at a wind-up speed of 393 m./min. exhibited the following single filament as-spun properties:
Tenacity—7.56 g./d.
Elongation—1.63%
Initial Modulus—563 g./d.
Denier—3.72

The fibers were heat treated in a flowing nitrogen atmosphere at 250° C. for 15 hours. The heat treated fiber properties were:
Tenacity—16.0 g./d.
Elongation—2.34%
Initial Modulus—630 g./d.

Fibers spun from the same polymer at 330° C. at a throughput of 0.42 g./min. and at a wind-up speed of 321 m./min. exhibited the following single filament as-spun properties:
Tenacity—8.8 g./d.
Elongation—1.4%
Initial Modulus—680 g./d.
Denier—4.6

Although the invention has been described with preferred embodiments, it is to be understood that variations and modifications may be employed as will be apparent to those of ordinary skill in the art. Such variations and modifications are to be considered within the purview and scope of the claims appended hereto.

We claim:

1. A melt processable poly(ester-amide) capable of forming an anisotropic melt phase at a temperature below approximately 400° C. consisting essentially of recurring moieties I, II, III, and IV wherein:

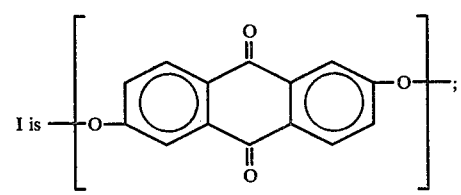

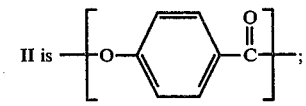

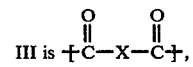

where X is selected from at least one member of the group consisting of
(a) 1,3-phenylene radicals which optionally are replaced with up to 75 mole percent of 1,4-phenylene radicals based upon the total concentration of 1,3-phenylene and 1,4-phenylene radicals present in moiety III,

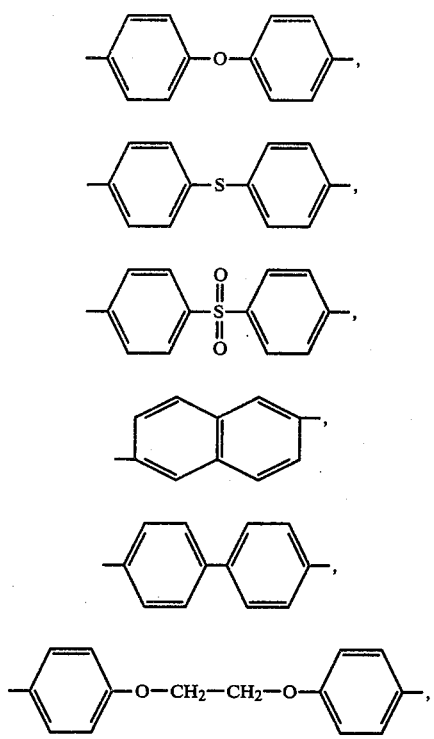

(h) a divalent aliphatic carbocyclic radical, and
(i) mixtures of the foregoing; and IV is {Y-Ar-Z}, where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 5 to 35 mole percent, moiety II is present in a concentration within the range of approximately 20 to 80 mole percent, moiety III is present in a concentration within the range of approximately 10 to 40 mole percent, and moiety IV is present in a concentration within the range of approximately 5 to 35 mole percent, with the total molar concentration of moieties I and IV being substantially equal to the molar concentration of moiety III.

2. The melt processable poly(ester-amide) of claim 1 which is capable of forming an anisotropic melt phase at a temperature below approximately 350° C.

3. The melt processable poly(ester-amide) of claim 1 which exhibits an inherent viscosity of at least approximately 0.7 dl./g. when measured at a concentration of 0.1 weight/volume percent in pentafluorophenol at 60° C.

4. The melt processable poly(ester-amide) of claim 3 which exhibits an inherent viscosity of at least approximately 2.0 dl./g. when measured at a concentration of 0.1 weight/volume percent in pentafluorophenol at 60° C.

5. The melt processable poly(ester-amide) of claim 1 wherein moiety I is present in a concentration within the range of approximately 5 to 30 mole percent.

6. The melt processable poly(ester-amide) of claim 1 wherein moiety II is present in a concentration within the range of approximately 30 to 70 moled percent.

7. The melt processable poly(ester-amide) of claim 1 wherein moiety III is present in a concentration within the range of approximately 15 to 35 mole percent.

8. The melt processable poly(ester-amide) of claim 1 wherein said divalent aliphatic carbocyclic radical of moiety III(h) comprises at least one trans-1,4-cyclohexylene radical.

9. The melt processable poly(ester-amide) of claim 1 wherein the X group of moiety III comprises 1,3-phenylene radicals which optionally are replaced with up to 75 mole percent of 1,4-phenylene radicals, based upon the total concentration of 1,3-phenylene and 1,4-phenylene radicals present in said moiety III.

10. The melt processable poly(ester-amide) of claim 1 wherein moiety IV is present in a concentration within the range of approximately 5 to 15 mole percent.

11. A molding compound comprising the melt processable poly(ester-amide) of claim 1 which incorporates approximately 1 to 60 percent by weight of a solid filler and/or reinforcing agent.

12. A molded article comprising the melt processable poly(ester-amide) of claim 1.

13. A fiber which has been melt spun from the melt processable poly(ester-amide) of claim 1.

14. A film which has been melt extruded from the melt processable poly(ester-amide) of claim 1.

15. A melt processable poly(ester-amide) capable of forming an anisotropic melt phase at a temperature below approximately 400° C. consisting essentially of recurring moieties I, II, III, and IV wherein:

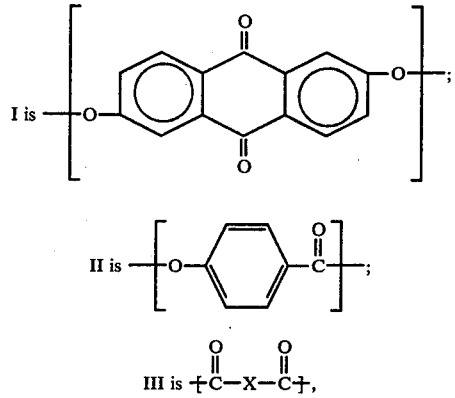

where X represents 1,3-phenylene radicals which optionally are replaced with up to 75 mole percent of 1,4-phenylene radicals based upon the total concentration of 1,3-phenylene and 1,4-phenylene radicals present in moiety III; and IV is {Y-Ar-Z} where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 5 to 30 mole percent, moiety II is present in a concentration within the range of approximately 30 to 70 mole percent, moiety III is present in a concentration within the range of approximately 15 to 35 mole percent, and moiety IV is present in a concentration within the range of approximately 5 to 15 mole percent, with the total molar concentration of moieties I and IV being substantially equal to the molar concentration of moiety III.

16. The melt processable poly(ester-amide) of claim 15 which is capable of forming an anisotropic melt phase at a temperature below approximately 350° C.

17. The melt processable poly(ester-amide) of claim 15 which exhibits an inherent viscosity of at least approximately 0.7 dl./g. when measured at a concentration of 0.1 weight/volume percent in pentafluorophenol at 60° C.

18. The melt processable poly(ester-amide) of claim 17 which exhibits an inherent viscosity of at least approximately 2.0 dl./g. when measured at a concentration of 0.1 weight/volume percent in pentafluorophenol at 60° C.

19. The melt processable poly(ester-amide) of claim 15 wherein moiety I is present in a concentration within the range of approximately 15 to 20 mole percent.

20. The melt processable poly(ester-amide) of claim 15 wherein moiety II is present in a concentration within the range of approximately 30 to 60 mole percent.

21. The melt processable poly(ester-amide) of claim 15 wherein moiety III is present in a concentration within the range of approximately 20 to 35 mole percent.

22. A molding compound comprising the melt processable poly(ester-amide) of claim 15 which incorporates approximately 1 to 60 percent by weight of a solid filler and/or reinforcing agent.

23. A molded article comprising the melt processable poly(ester-amide) of claim 15.

24. A fiber which has been melt spun from the melt processable poly(ester-amide) of claim 15.

25. A film which has been melt extruded from the melt processable poly(ester-amide) of claim 15.

26. A melt processable poly(ester-amide) capable of forming an anisotropic melt phase at a temperature below approximately 400° C. consisting essentially of recurring moieties I, II, III, and IV wherein:

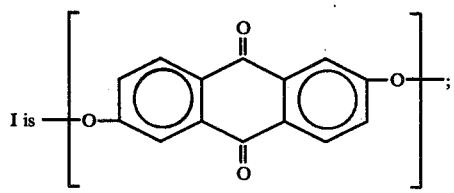

-continued

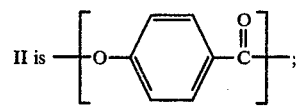

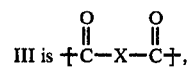

where X represents 1,3-phenylene radicals which optionally are replaced with up to approximately 75 mole percent of 1,4-phenylene radicals based upon the total concentration of 1,3-phenylene and 1,4-phenylene radicals present in moiety III; and IV is {Y-Ar-Z} where Ar is a divalent radical comprising at least one aromatic ring, Y is O, NH, or NR, and Z is NH or NR, where R is an alkyl group of 1 to 6 carbon atoms or an aryl group, wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 15 to 20 mole percent, moiety II is present in a concentration within the range of approximately 30 to 60 mole percent, moiety III is present in a concentration within the range of approximately 20 to 35 mole percent, and moiety IV is present in a concentration within the range of approximately 5 to 15 mole percent, with the total molar concentration of moieties I and IV being substantially equal to the molar concentration of moiety III.

27. The melt processable poly(ester-amide) of claim 26 which is capable of forming an anisotropic melt phase at a temperature below approximately 350° C.

28. The melt processable poly(ester-amide) of claim 26 which exhibits an inherent viscosity of at least approximately 0.7 dl./g. when measured at a concentration of 0.1 weight/volume percent in pentafluorophenol at 60° C.

29. The melt processable poly(ester-amide) of claim 28 which exhibits an inherent viscosity within the range of approximately 2.5 to 3.0 dl./g. when measured at a concentration of 0.1 weight/volume percent in pentafluorophenol at 60° C.

30. A molding compound comprising the melt processable poly(ester-amide) of claim 26 which incorporates approximately 1 to 60 percent by weight of a solid filler and/or reinforcing agent.

31. A molded article comprising the melt processable poly(ester-amide) of claim 26.

32. A fiber which has been melt spun from the melt processable poly(ester-amide) of claim 26.

33. A film which has been melt extruded from the melt processable poly(ester-amide) of claim 26.

* * * * *